Patented May 24, 1938

2,118,324

UNITED STATES PATENT OFFICE 2,118,324

PROCESS OF DRYING FRUIT

Earl N. Percy, Oakland, Calif., assignor to Dry Fruit Products Company, Oakland, Calif., a corporation of California No Drawing. Application December 24, 1935, Serial No. 56,083

1 Claim. (Cl. 99—204)

The invention relates to drying or dehydration of fruit and other food products such as disclosed in the patents to Charles C. Moore, Numbers 1,543,948 and 2,023,536, issued June 30, 1925, and December 10, 1935, respectively.

As disclosed in these patents, it is possible by proper processing to dehydrate ordinary commercially dried fruit to a point reducing the fruit substantially to its sugar content and leaving the latter in an anhydrous crystalline form. As disclosed in these patents, the fruit is first comminuted and shaped into the form of a wafer or cake and then dried under suitable conditions of temperature and pressure so as to substantially completely dehydrate the fruit without effecting any material change in the chemical structure of the fruit sugar. This dehydrating is made possible by drying the fruit in a vacuo so as to lower the boiling or vapor point of the moisture to a temperature where the fruit may be safely dehydrated without decomposition of the fruit sugar.

It is very desirable to carry the drying process to substantially complete dehydration of the fruit whereby the same will be reduced, as above mentioned, to the essential fruit fibre, tissues, mineral matter and fruit sugar or fructose. This product results in a hard, crunchy, crystalline substance which is a most tasty and delicate food substance and may be consumed in wafer or cake or in ground form. Since, as will be understood, the process entails the use of sealed chambers for drying the fruit, it is extremely difficult to gauge the drying process to a nicety where the product will not be on the one hand too wet, or on the other hand overheated to an extent where the fruit sugars will be partially decomposed and their sweetness turned to acridity. The use of a relatively low temperature in the drying chamber prolongs the process to an extent as to make the product commercially expensive, and also produces a pulverulent product which has not the quality or the salability of the hard, crunchy, crystalline structure above referred to. It is therefore necessary to use a relatively high temperature in the drying chamber so as to shorten the drying process, and as long as there is a considerable moisture content in the fruit the temperature of the fruit itself is maintained within safe limits. As the fruit reaches a dehydrated state, however, the temperature gradually increases until, with the final evaporation of moisture, the temperature instantly rises and almost immediate decomposition of the fruit sugar sets in. This first decomposition may be readily detected by tasting, and microscopic examinations appear to show, especially on further decomposition, the presence of finely scattered particles of carbon in the dry fruit structure.

It has been necessary, therefore, under the old processes, for an operator to judge entirely from experience the condition of the fruit in the drying chamber. Thus, to be on the safe side, he would need to discontinue the drying process prior to a full dehydration of the fruit while always trying to reach as nearly this state as possible. In accordance with the present invention, I have discovered means for accurately determining the condition of the fruit throughout the entire drying process and indicating exactly the state of full dehydration of the fruit.

Briefly stated, this means comprises an electrical circuit for measuring the electrical resistance of the fruit throughout the drying process. I have found that when the electrical resistance of the fruit is plotted against the time of the process, initially the relatively high moisture content of the fruit produces a relatively low resistance. As the fruit dries, the resistance increases as an inverse function of the moisture content until the last bit of moisture serving as an electrolyte in the fruit is evaporated, leaving a fully dry state. The electrical resistance reaches a sharp and very well defined peak at this point and falls sharply off incident to the decomposition of the fruit sugar. Thus, under conditions made standard by experience, the operator has only to watch the resistance of the fruit to know exactly when to discontinue the drying process and a uniform and perfect quality of dry fruit is insured.

More specifically, the electrical circuit aforesaid may be of any standard design using an ohm-meter in a series circuit including a source of electrical potential and the fruit, or a Wheatstone bridge arrangement in a similar circuit may be employed. The connection of the circuit to the fruit may be provided by a pair of suitable electrodes embedded in or placed in contact with the fruit in the drying chamber. To reduce the apparatus to standard conditions, it is of course preferable that the spacing of the electrodes for any one type of fruit or food be constant along with the voltage and other electrical characteristics of the circuit.

I claim:

In the process of drying fruit by dehydration under suitable conditions of pressure and temperature for reducing the fruit sugar to substantially an anhydrous crystalline form, the method of determining the extent of dehydration which consists in measuring the electrical resistance of the fruit, dehydrating the fruit during the period the electrical resistance of the fruit increases, and discontinuing said dehydrating substantially at the point of maximum resistance of said fruit.

EARL N. PERCY.